United States Patent
Thomas et al.

(10) Patent No.: US 6,236,954 B1
(45) Date of Patent: May 22, 2001

(54) PROCESS FOR ESTIMATING THE SPEED OF A VEHICLE OR OF AN ASSEMBLAGE OF VEHICLES

(75) Inventors: Jean-Luc Thomas, Thomery; Patrick Latteux, Veneux les Sablons; Jean-Claude Alacoque, Communay; Guy Bornard, Saint Isnier; Mazen Alamir, Saint Egreve, all of (FR)

(73) Assignee: Alstom Transport SA, Paris (FR)

( * ) Notice: Subject to any disclaimer, the term of this patent is extended or adjusted under 35 U.S.C. 154(b) by 0 days.

(21) Appl. No.: 09/200,415

(22) Filed: Nov. 27, 1998

(30) Foreign Application Priority Data

Nov. 27, 1997 (FR) .................................................. 97 14908

(51) Int. Cl.$^7$ .................................................. G01P 15/03
(52) U.S. Cl. ................................. 702/142; 73/1.37; 73/488
(58) Field of Search .................................. 702/145, 141, 702/142; 73/1.37, 1.38, 121, 178, 507, 488; 33/318; 324/160; 364/528.39

(56) References Cited

U.S. PATENT DOCUMENTS

| 4,164,872 |   | 8/1979 | Weigl ..................................... 73/510 |
| 5,203,821 | * | 4/1993 | Tanaka ..................................... 73/1 |
| 5,608,631 | * | 3/1997 | Tsutsumi et al. ............. 764/426.018 |
| 5,763,778 | * | 6/1998 | Kim ..................................... 73/488 |
| 5,804,724 | * | 9/1998 | Lansberry et al. ..................... 73/488 |

* cited by examiner

*Primary Examiner*—Marc S. Hoff
*Assistant Examiner*—Edward Raymond
(74) *Attorney, Agent, or Firm*—Young & Thompson

(57) ABSTRACT

A process for estimating the speed of a vehicle or of an assemblage of vehicles, based on measuring the speeds of the mechanically independent wheels, while all the wheels are slipping with respect to the rolling surface, the process includes a step using mechanical and kinematic information characteristic of the vehicle or vehicles.

16 Claims, 1 Drawing Sheet

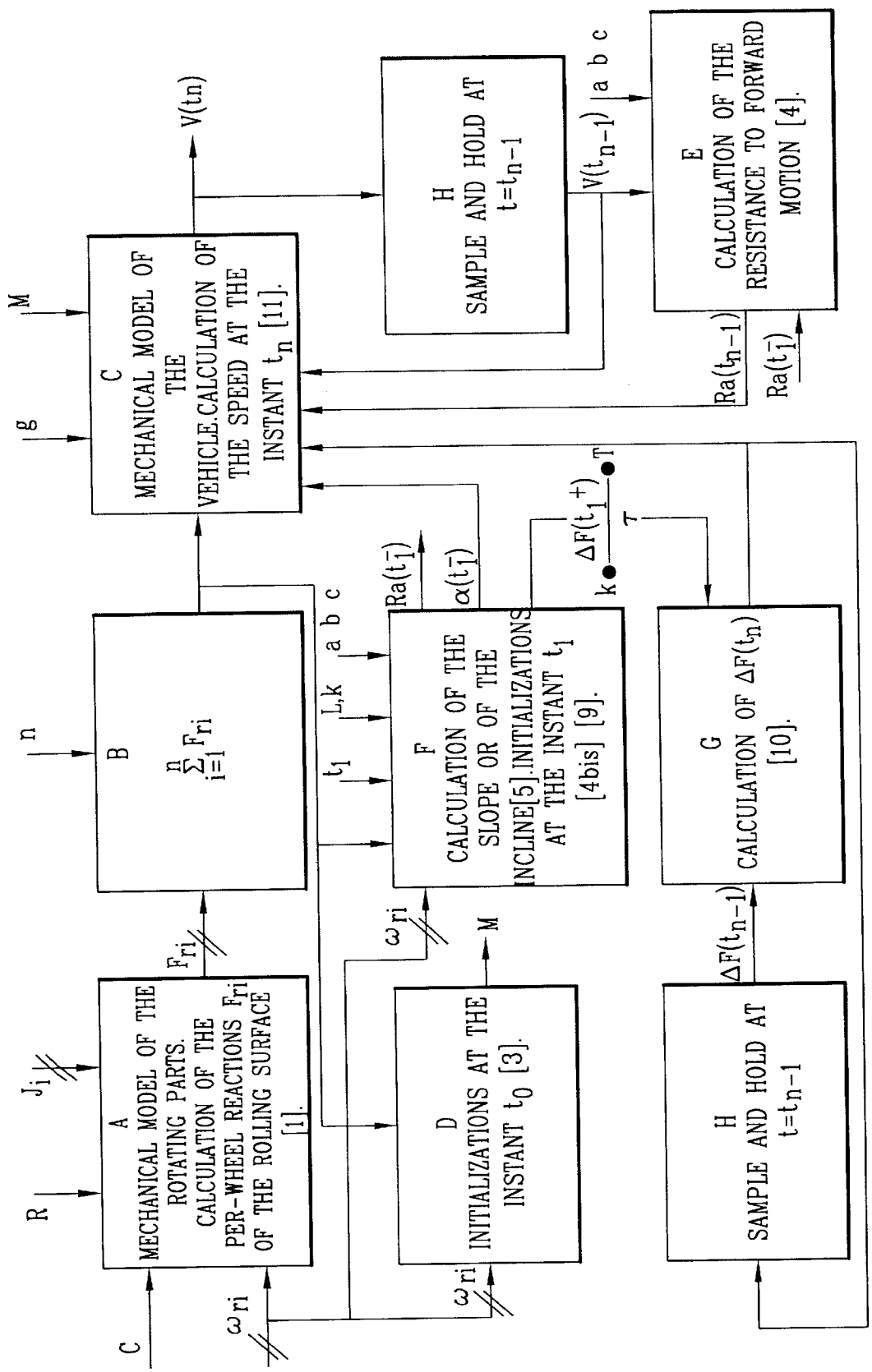

PROCESS FOR ESTIMATING THE SPEED OF A VEHICLE OR OF AN ASSEMBLAGE OF VEHICLES

The present invention relates to a process intended for estimating the speed of a single vehicle or one which is connected to other vehicles, fitted with wheels which can slip with respect to their rolling surface, when they transmit a load intended for accelerating or decelerating the said vehicle. Application in particular to railway vehicles.

A first type of prior art documents relates to control processes for improving the adhesion of a wheel with respect to the rolling surface.

A second type of prior art documents relates to processes for estimating the speed of a vehicle in particular while all its wheels are slipping with respect to the rolling surface.

Only the second type of prior art documents constitutes the state of the art of the invention, since the present invention pertains to an estimator of vehicle speed when all the wheels can slip simultaneously with respect to the rolling surface.

Nevertheless, it seems of interest to analyse both prior art document types so that the characteristics of the invention may be better placed.

1—Patents Pertaining to the Improvement of Adhesion 1.1—U.S. Pat. No. 5,471,387A—Apr. 18, 1994—Westinghouse Air Brake Company This is a process intended for reducing the braking load in a manner which is dependent on the deceleration of the axle, when jamming is detected during braking by comparing:

a threshold which depends on the absolute speed of the axle, with the speed discrepancy resulting from the integration over time of the axle acceleration, when the latter exceeds another pre-set threshold.

The speed discrepancy acting at the same time as the deceleration of the axle for reduction of the braking load.

The inputs of this command are the acceleration of the axle (12) and the speed of the axle (10). No mention is made of the use of a vehicle speed.

1.2—U.S. Pat. No. 5,390,990A—Nov. 24, 1993—Hydro-Aire Division of Crane Company

This document describes a complete system for applying and distributing loads between the various vehicles, coupled in convoy by a link exhibiting non-zero elasticity, so as to limit the coupling reactions during braking.

It therefore involves modulating the load applied to the wheel by way of a braking electric valve, as a function of the discrepancy between the measured speed of the wheel (20) and a speed referred to as the reference speed, the latter being generated in a preferential manner on the basis of a deceleration command emanating from a control handle (2-45).

1.3—U.S. Pat. No. 5,424,948A—Nov. 10, 1993—General Motors Corporation

The process described maximizes the load transmitted by the wheels of a locomotive to the rail through the coefficient of adhesion, via a command applied to the current and field regulator of the electric motor of the locomotive using the principles of fuzzy logic, the membership functions of which are:

the sliding error between the setting and the measurement the variation in the slip of the wheel with respect to the rail a stability function calculated on the basis of the variation in the current of the electric motor and of the sliding error (equations 7 and 8).

To calculate the slip, the speed of the wheels and that of the locomotive with respect to the ground (3-37) are measured separately.

1.4—EP 0 592 288 A1—Oct. 6, 1992—Thomson CSF

The document pertains to searching for the command which maximizes the braking load produced as a function of the slip of the wheel of a vehicle with respect to a pathway, in respect of a type of adhesion which can be invoked as a function of the slip known in advance. The process described uses a fuzzy-logic regulator, the membership functions of which are:

the value of the slip of the wheel with respect to the pathway the value of the derivative of this slip with respect to the time the value of the derivative of the torque produced with respect to the slip so as to act on the pressure of the braking control fluid.

The slip is obtained by differencing between two speeds every two measurements (FIG. 9):

the speed of the wheel (46), the speed of the vehicle termed the reference speed (48).

1.5—U.S. Pat. No. DE 4,309,183 A1 (FR 9 403 136)—Mar. 22, 1993—Siemens AG

This document pertains to a process intended for maximizing the frictional force which depends on the slip and occurs at surfaces which rub against one another, through the use of a fuzzy-logic regulator, the membership functions of which are:

the variation in the frictional force the variation in the slip enabling the slip to be corrected via rules expressing the necessary equality of the signs:

of the partial derivative of the load transmitted with respect to the slip, on the one hand and of the variation in the slip, on the other hand.

The slip is calculated by differencing between the measured speed of the wheel and the measured speed of the vehicle by devices which are not described.

2—Patents Pertaining to Estimation of the Speed of the Vehicle 2.1—EP 0 716 001 A1—Nov. 30, 1995—Gec Alsthom Transport SA The process described pertains to the estimation of an upper bound on the speed of the vehicle, to allow the determination of an upper bound on the distance travelled for example by integrating this speed, using a finite-state automaton with defined and quantified conditions of transition from one state to another. One of the states is characterized by the fact that all the wheels of the vehicle skid or jam at the same time. In this case, according to the process described, an upper bound on the speed of the vehicle is calculated by adding during braking, to the speed of the wheel, an upper bound on the slip estimated, according to claim 4, at 15%. During wheel lock, defined as another state of the automaton, the estimate of the upper bound on the speed is no longer used.

Hence, this is not a matter of estimating the speed of the vehicle including during a transient locking of the wheels, but of defining once-off an upper bound and the conditions of validity of this calculation.

2.2—U.S. Pat. No. 5,453,942 A—Jun. 6, 1994—Westinghouse Air Brake Company

The process described estimates the speed of a railway vehicle during braking on the basis of the measurement of the speeds and decelerations of four axles during prolonged jamming. During this phase, the calculation increments, at a fixed period, the measurement of the speed of the vehicle, obtained before detecting prolonged jamming and stored, by an equal amount. This amount of incrementation is equal to the sliding average of the discrepancys, from a measurement sampled at a fixed period, to the next, of the value of the minimum speed of the four axles, which sliding average is obtained over 32 samples and is itself stored at the moment of detection of prolonged jamming.

The speed of the vehicle before detection of prolonged jamming is obtained by calculating the minimum speed of the four axles during braking before the detection of prolonged jamming.

To summarize, the process described uses an algorithm for estimating the speed of a vehicle during prolonged jamming, based on extrapolation of the speed of the axle having the minimum speed, which extrapolation is carried out by assuming that the deceleration of this axle is constant. The value of the speed and of the deceleration are the values taken by these two quantities respectively during braking and before prolonged jamming, which values are stored after processing.

2.3—U.S. Pat. No. DE 3,837,909—Nov. 4, 1988—Karl Hahn, dipl.-ing., Berlin

The process describes the estimating of the speed of a vehicle under traction and during braking, on the basis of the measurement of the speed of the motor by an incremental encoder. According to this process, an estimated value of the absolute slip, in terms of absolute value, of the wheel with respect to the rail is added to or deducted from this speed depending on whether braking or traction respectively is applied.

This value of slip is deduced from two nets of curves established a priori giving the load produced as a function of the relative slip and of the absolute speed of the vehicle. Each of these nets describing an operating region:

stable operation or pseudo-slip region in which an increase in the relative slip corresponds to an increase in the load transmitted to the rail, unstable operation or skidding or jamming region in which the same increase in the relative slip leads on the contrary to a decrease in the load transmitted to the rail.

The choice of the net corresponding to one or the other region being made as a function of the value of the load setting, of the load produced and of the speed of the vehicle.

Estimation of the speed of the vehicle therefore relies on a priori and constant knowledge of the adhesion characteristic of the vehicle. In actual fact this characteristic depends very strongly on numerous factors of which the main one is the state of the track and its variations are not predictable.

2.4—EP 0 499 947 A1—Feb. 13, 1991—KNORR-BREMSE AG

The process describes the estimating of the speed of a vehicle, according to the state of the system, on the basis of the calculation of the filtered maximum speed of the wheels, with the following logic:

if the estimated speed is less than the filtered maximum speed, the new estimate of speed is then taken equal to the filtered maximum speed by adding a correction, if the estimated speed is greater than the filtered maximum speed and if moreover no wheel lockup is observed, the estimated value is decremented by a value da1, if the estimated speed is greater than the filtered maximum speed and if a return to adhesion is observed after a lockup and a time delay, the new estimate of speed is then taken equal to the filtered maximum speed by calculating a correction.

Hence, this involves iterative and recursive estimation of the speed of a braking vehicle, based on successive corrections of a measurement of filtered maximum speed of the wheels.

3—Document U.S. Pat. No. 5,453,942 A from Westinghouse Air Brake Company

We shall not adopt from the abovementioned state of the art those documents pertaining to a complete anti-skid or anti-jamming system, which documents do not describe the way in which the speed of the vehicles is measured when all the wheels of the vehicle are skidding or are jammed.

We shall therefore adopt the document U.S. Pat. No. 5,453,942 which pertains to the estimating of the speed of a vehicle during a loss of adhesion.

It is also possible to adopt the document EP 81 017 056 by Faiveley, "Procédé pour mesurer la vitesse d'un véhicule sur voie ferrée et dispositif pour sa mise en oeuvre" [Process for measuring the speed of a vehicle on a railway track and device for the implementation thereof].

4—Description of the State of the Art

As indicated earlier, the invention relates to a process intended for estimating the speed of a single vehicle or one which is connected to other vehicles, fitted with wheels which can slip with respect to their rolling surface, when they transmit a load intended for accelerating or decelerating the said vehicle. Application in particular to railway vehicles.

When the wheels of a vehicle transmit a load to the rolling surface, they do so by way of a coefficient of friction which depends on numerous factors, including the geometrical dimensions of the wheels, the nature of the material in contact with the rolling surface, the nature of the rolling surface and its condition, the presence, the condition and the nature of solids or liquids between the wheel and the rolling surface, the weight applied by the vehicle to the wheel dynamically, the slippage of the wheel with respect to the rolling surface, the temperature, etc. These factors may vary rapidly in an unpredictable manner, over time or in space, causing a total or partial loss of adhesion and hence slippage of the wheel with respect to its rolling surface. Moreover, it may be necessary to bring about this slippage and to maintain it so as to increase the transmission of the load between the wheel and its support. Load transmitted via the coefficient of wheel/support friction when the wheel slips with respect to this support produces energy which improves the coefficient of friction. The management of this slippage is carried out according to known processes which make it possible to maximize the load transmitted as a function of the slip. The abovementioned documents U.S. Pat. No. 5,424,948, EP 0 592 288 and U.S. Pat. No. DE 4,309,183 describe such processes.

The relative slip of each of the wheels, which we shall agree henceforth to refer to as slip, is defined as the discrepancy in the linear speeds between a wheel and the vehicle, which discrepancy is referred to the speed of the vehicle. This slip is therefore positive or zero under traction. Hence, knowledge of this slip involves measuring the speed of the load-transmitting wheels and knowledge of the speed of the vehicle with respect to the rolling surface, whether the latter is fixed with respect to a Galilean frame or is itself moving.

Knowledge of the speed of the vehicle with respect to its rolling surface, hereinafter referred to as the reference frame, has numerous applications other than optimizing the transmission of acceleration or deceleration loads. Thus, it is often necessary to know the speed of a vehicle accurately with respect to its reference frame which may be the ground for example, so as to display it in the driver's cab, so as to use it to feed back a slaved quantity, so as to store it for control purposes, so as to limit the speed of the vehicle over certain parts of the journey or as a function of the distance separating it from a vehicle in front, or so as to know, by integrating the speed with respect to time, the distance travelled between position gauging beacons (odometry).

Existing solutions are imperfect. Thus, it is possible to use a Doppler-effect radar, which is expensive and does not operate properly in the presence of snow or sand. This system cannot in general be used on its own to ensure the safety and availability of the vehicle. When it is used, it is coupled with other systems operating on different principles.

A second solution lies in the use of a speed sensor on a wheel or an axle, laden so as to avoid becoming detached, and which is non-driving and moreover under-braked so as to avoid any slip with respect to the reference frame. This solution is not always possible since, for reasons associated with enhancing the kinematic performance of vehicles, it is not possible to apply the maximum load, braking load in particular, to all the wheels of the vehicle. Such is the case for automobiles, buses, trams, high-speed trains, locomotives, etc.

Other solutions make it possible to estimate the speed of the vehicle with respect to its reference frame on the basis of measurements of the speed of the wheels, with transmission of load and in the presence of slippage of the wheel with respect to the reference frame of the vehicle.

One of the known processes is described in document U.S. Pat. No. 5,453,942, Wheel spin speed processing system for multiple-axle railway vehicles, mentioned above. This process estimates the speed of a railway vehicle during braking on the basis of the measurement of the speeds and decelerations of four axles during prolonged jamming. During this phase, the calculation increments, at a fixed period, the measurement of the speed of the vehicle, obtained before detecting prolonged jamming and stored, by an equal amount. This amount of incrementation is equal to the sliding average of the discrepancys, from a measurement sampled at a fixed period, to the next, of the value of the minimum speed of the four axles, which sliding average is obtained over thirty-two samples and is itself stored at the moment of detection of prolonged jamming.

The speed of the vehicle before detection of prolonged jamming is obtained by calculating the minimum speed of the four axles during braking before the detection of prolonged jamming.

To summarize, the process described uses an algorithm for estimating the speed of a vehicle during prolonged jamming, based on extrapolation of the speed of the axle having the minimum speed, which extrapolation is carried out by assuming that the deceleration of this axle is constant. The value of the speed and of the deceleration are the values taken by these two quantities respectively during braking and before prolonged jamming, which values are stored after processing.

This process, like other processes described in other inventions or in the specialized literature, proposes an extrapolation of the measurement of the speed of a vehicle during the phase of loss of adhesion characterized by the slippage of all the wheels, on the basis of kinematic information stored at the beginning of this phase and extracted from the speed of all the wheels of the vehicle. In practice, these estimates suffer from the following limitations which the present invention proposes to avoid:

the process described calculates the minimum speed out of the speeds of four axles and the deceleration of the axle possessing this minimum speed. In the process, no use is made of the measurements of speed or acceleration of the axles which exhibit a greater speed and which nevertheless participate in transmitting the load and hence in varying the speed of the vehicle. This information, which is useful for estimating the speed of the vehicle while all the axles are slipping, has to be preserved in full and processed on an individual basis so as to improve the accuracy of the estimate. Other processes calculate the minimum and maximum speeds and use only these two items of speed information, and likewise for the accelerations. They therefore suffer from the same limitations.

the process described does not use the information which is known or can be measured or estimated on the state of the vehicle and which influences its kinetics, such as for example the inertia of the rotating masses represented by the wheels, the axles, the reducing gears, the transmission shafts, the brake discs, the rotors of the electric motors, or the weight of the vehicle which often varies by ±30% depending on its state of loading, or alternatively the force produced by the engine and the braking device.

As a result of this, it is difficult to adjust such estimators because they use variables which cannot be directly interpreted physically or functionally, such as thresholds on speeds or accelerations.

Another consequence is that the adjustments are invariant depending on the running conditions and therefore cannot be optimized for all operating cases. This therefore results in a considerable loss of accuracy of the estimate in all the cases which differ, by one or more parameters, from the mode of operation in which the initial adjustment was made.

finally, the estimate of the speed ignores the variation in the condition of the rolling surface during slippage and hence the fluctuations in the coefficient of friction during transmission of the load. Now, the coefficient of friction varies rapidly within wide proportions. Thus, in the case of the rail, the coefficient of adhesion defined as the ratio between: the reaction of the rail to the torque transmitted by the wheel, and the weight applied to this same wheel, may vary from 45% to a few per cent, owing to atmospheric pollution, the deposition of engine oil or plant debris, and also even because of slippage with friction which changes the local conditions of wheel/rail contact. The estimate is therefore corrupted by all the changes in condition of slip.

5—Description of the Invention

The present invention is such as characterized below and sets out to solve the technical problem consisting in avoiding as far as possible all the drawbacks mentioned above so as to improve the accuracy of the estimate of the speed of the vehicle during the slippage phase.

It will be noted firstly that the only accurate and constant knowledge possessed regarding the contact between the wheel and its rolling surface irrespective of its condition and the value of the slip (from 0 to 100%) is the fact that the driving, or retarding, force Fr is, in all cases, transmitted in full from the wheel to the vehicle through the coefficient of friction via the reaction of the rail. The mechanical or thermal energy occurring in the contact is due to the discrepancy in speed between the points of application of the force, on the one hand, and of the reaction, on the other hand.

Let $J_i$ be the inertia of the rotating masses, such as defined earlier, driven with wheel number i of the vehicle, $V_{ri}$ the measured linear speed of this wheel, $\omega_{ri}$ its angular speed and R its radius. Moreover, let C be the driving (positive) or retarding (negative) torque applied to this wheel by the motor or the brake, and $C_{ri}$ the resistive torque applied to the wheel i by the reaction of the rail $F_{ri}$ via the friction resulting from the slip.

It often happens that the wheels are not independent in relation to the load applied. When several wheels are rigidly linked, for example by an axle and/or by a transmission shaft, it is then appropriate to regard the index i as applying to the set of linked wheels which therefore rotate at the same speed $V_{ri}$. $J_i$ then denotes the total inertia and $C_{ri}$ the total resistive torque applied to the group of wheels.

Under these conditions, it is possible to write:

$$J_i \cdot \frac{d\omega_{ri}}{dt} = C - C_{ri}$$

with:

$$\omega_{ri} = \frac{V_{ri}}{R}$$

$$F_{ri} = \frac{C_{ri}}{R}$$

and hence, equivalently:

$$F_{ri} = \frac{C}{R} - \frac{1}{R^2} \cdot J_i \cdot \frac{dV_{ri}}{dt} \quad [1]$$

It is therefore clearly apparent at this stage of the description that $F_{ri}$ can be calculated exactly from the knowledge of C, R, $J_i$ and from the measurement of the speed of the wheels by temporal differentiation or high-pass filtering.

This is because the value of R and $J_i$ are elements which are known to the designer of the vehicle, or can be measured or else calculated simply. C can be measured continuously in the case of an electric motor on the basis of electrical quantities such as voltage, current and/or magnetic flux of the machine. In the case of thermal engines it can be estimated by measuring pressure, speed, temperature, consumption. Likewise, in the case of hydraulic elements, by measurements of pressure and flow rate, or by any other known means. Should there be no instruments available for measuring the torque actually applied, a good estimate can be made of this torque by using the torque setting emanating from the driver or from automatic controllers. Thus, for a road vehicle with a thermal engine operating with a known ambient temperature, a good estimate of the torque is provided by the position of the vehicle accelerator pedal. In the case of the pneumatic braking of an underground train, a good estimate of the value of the braking torque can be provided by the pressure in the brake cylinder or by default by the braking setting provided by the driver's control handle and transmitted along the train line.

Moreover, on a vehicle the reaction force applied to the wheel or to the group of wheels participates in accelerating or decelerating the vehicle. On an individual vehicle it is therefore possible to write:

$$M \cdot \frac{dV}{dt} = Mg\sin(\alpha) + \sum_{i=1}^{n} F_{ri} - Ra \quad [2]$$

with:

M: representing the mass of the vehicle

V: being the speed of the vehicle g: the acceleration due to gravity (g=9.81 m/s$^2$)

α: representing the angle of the rolling surface with the horizontal at this location with the following sign convention:

α is positive if the slope tends to accelerate the vehicle n: number of groups of independent wheels on the vehicle Ra: resistance to forward motion The extension of this formula to a chain of vehicles is immediate when n is regarded as the number of independent wheels of the assemblage thus formed.

It should then be noted that most of the quantities appearing in this relation are known or measurable quantities.

5.1—Estimate of Mass

The mass of the empty vehicle is known. This mass can be measured under loading, by known devices, of the on-load mechanical corrector type used for the pneumatic or hydraulic braking circuits of vehicles, or by pressure measurements in the suspensions of the vehicle when they are pneumatic or hydraulic. When such devices do not exist or when they are inoperable, such as for example for freight locomotives where the mass to be used is that of the complete convoy rather than that of the locomotive alone, it is then easy to estimate the mass of the convoy on start-up, just after its formation which is always carried out on flat terrain (α=0), on the basis of relation [2], noting that at low speed the resistance to forward motion is negligible. Hence, in this case, relation [2] becomes:

$$M \cdot \left(\frac{dV}{dt}\right)_{t=t0} = \sum_{i=1}^{n} F_{ri}$$

Relation [1] which still holds provides the value of:

$$\sum_{i=1}^{n} F_{ri}$$

from the measurement of the speed of the wheels and from the calculation of their acceleration.

If, moreover, during the first moments of start-up, it is established for sure that no wheel is slipping with respect to the rail, for example by checking, according to known processes, the simplest of which is to demonstrate that no wheel exhibits an acceleration greater than an acceleration threshold acceptable for such a convoy, for example 1 m/s$^2$, it will therefore be possible in this case to regard the linear speed of the wheels as being equal and identical to that of the locomotive. Depending on the means used to obtain the measurement of the speed of the wheels, the measurement result is more or less accurate and in practice an average value of the measurement signals for the speeds of the wheels will be used, or the maximum value, to equate it to the speed of the convoy, and hence to calculate for example on the basis of the average speed, but without this limiting the scope of the invention, the acceleration of the convoy:

$$\frac{dV(t)}{dt} = \frac{d}{dt}\left(\frac{\sum_{i=1}^{n} V_{ri}(t)}{n}\right) \quad \text{for } t = t_0$$

Ultimately, it is possible to estimate the value of the mass of the convoy on start-up and then to retain this value until its configuration changes, via the following calculation:

$$M = n \cdot \frac{\sum_{i=1}^{n} F_{ri}}{\sum_{i=1}^{n} \left(\frac{dV_{ri}(t)}{dt}\right)_{t=t0}} \quad [3]$$

5.2—Estimating Resistance to Forward Motion

Certain vehicles may reach considerable speeds for which the resistances to forward motion for example in air are now no longer negligible compared with the loads used for their acceleration or braking. The value of these retarding loads depends on vehicle construction parameters such as its cross section and its aerodynamic penetration coefficient (Cx). The resistances to forward motion are generally modelled by polynomials in the speed of the vehicle. Thus, by way of example:

$$Ra(t) = a + b \cdot V(t) + c \cdot V(t) \quad [4]$$

where a, b and c are positive known coefficients.

Hence, it is very simple to calculate Ra in real time so long as at least one wheel of the vehicle is not slipping with respect to its rolling surface. Let j be this wheel's number. The resistance to forward motion is calculated, at the instant $t_1^-$ immediately preceding the slipping of the last wheel with respect to the rolling surface, simply by:

$$Ra(t_1^-) = a + b \cdot V_r(t_1^-) + c \cdot V_r(t_1^-)^2 \quad [4\ bis]$$

In practice, the $V_{rj}$ values are measured continually, at regular time intervals, and $V_r(t_1^-)$ is stored at the moment at which it is detected that the last wheel j, which was not slipping hitherto, begins to slip:

$$V_r(t_1^-) = V_{rj}(t_1^-)$$

5.3—Estimating the Slope ($\alpha > 0$) or the Incline ($\alpha < 0$)

The slope or the incline can be estimated in the same way as can the resistance to forward motion, at the instant $t_1^-$, just before the last wheel j begins to slip and its value stored throughout the time for which all the wheels of the vehicle are slipping, through the following calculation using relation [2] at the instant $t_1^-$:

$$\alpha(t_1^-) = \text{Arcsin}\left(\frac{1}{Mg}\left[M \cdot \left(\frac{dV_r(t)}{dt}\right)_{t=t1^-} - \sum_{i=1}^{n} F_{ri} + Ra(t_1^{-1})\right]\right) \quad [5]$$

A relation in which:

M is measured or estimated at the instant to according to relation [3]

g is a constant $\left(\frac{dV_r(t)}{dt}\right)_{t=t1^-}$ is calculated at the instant $t_1^-$ from the measurement of the speed of wheel j $\sum_{i=1}^{n} F_{ri}$ is calculated continually on the basis of relation [1]

$Ra(t_1^-)$ is calculated on the basis of relation [4 bis]

5.4—Estimating the Speed of the Vehicle While All the Wheels are Slipping

It then becomes possible to estimate the speed of the vehicle onwards of the time $t_1^-$ on the basis of equation [2] by substituting therein the measured or estimated terms by relations [1], [3], [4] hand [5].

$$M \cdot \frac{dV(t)}{dt} = Mg\sin(\alpha(t_1^-)) + \sum_{i=1}^{n} F_{ri}(t) - Ra(t) \quad [6]$$

This formulation assumes that the declivity remains constant throughout the phase in which all the wheels are slipping, a valid supposition when the distances travelled by the vehicle during this type of operation are regarded as remaining limited to a few hundred meters.

If however this supposition did not hold for certain applications in which better accuracy is sought with regard to large distances of acceleration or of deceleration at constant slip of all the load-transmitting wheels, it would be sufficient to reduce the load, at periodic intervals, until at least one wheel recovers its complete adhesion, so as to allow an updating of the value of the declivity. The time intervals may be inversely proportional to the estimated speed of the vehicle so that the distance travelled during this spell of time is substantially identical and bounded.

A first solution consists in regarding Ra(t) as also constant between two updates of the estimate of the slope and hence equal to $Ra(t_1^-)$. The speed is then deduced from the following relation, derived from equality [6]:

$$V(t) = \frac{1}{M} \cdot \int_{t1}^{t} \left[Mg\sin(\alpha(t_1^-)) + \sum_{i=1}^{n} F_{ri}(t) - Ra(t_1^-)\right] dt + V_r(t_1^-) \quad [7]$$

A more accurate solution is to discretize equation [6] so as to calculate the estimate of the speed at closely spaced time intervals and to use, to calculate Ra, the value of this term at the previous calculation instant for which the speed of the vehicle was known:

This estimate is therefore expressed simply by the following recurrence relation:

$$V(t_n) = V(t_{n-1}) + \Delta V(t_n)$$

in which $\Delta V(t_n)$ is calculated through relation [6] discretized:

$$V(t_n) = V(t_{n-1}) + \frac{T}{M} \cdot \left[Mg\sin(\alpha(t_1^-)) + \sum_{i=1}^{n} F_{ri}(t_n) - Ra(t_{n-1})\right] \quad [8]$$

where:

$T = t_n - t_{n-1}$

The first terms of this recurrence relation for n=1 are:

$$V(t_{n-1}) = V_r(t_1^-)$$

and:

$$Ra(t_{n-1}) = Ra(t_1^-)$$

5.5—Transient Corrections

To improve the accuracy of the estimate of the speed of the vehicle during the phase in which all the wheels are slipping with respect to the rolling surface, it is necessary to correct relation [8] so as to take account of the fact that detection of slippage of the last wheel is carried out with a considerable delay owing to the fact that the wheels start slipping in an abrupt manner.

Moreover, it is necessary to ensure the continuity of the acceleration or of the deceleration of the vehicle or vehicles, over an abrupt variation in the adhesion which propagates under all the wheels of the vehicle or of the convoy during a characteristic response time of the system proportional to:

$$\tau = \frac{L}{V(t_1^-)}$$

where L represents the length of the convoy of vehicles travelling at the estimated speed $V(t_1^-)$.

It is advisable to add in the term whose initial value is:

$$\Delta F(t_1^+) = \sum_{i=1}^{n} F_{ri}(t_1^+) - \sum_{i=1}^{n} F_{ri}(t_1^-)$$

i.e. by replacing the second term in the right-hand side of the above equality by its expression-derived from relation [2]:

$$\Delta F(t_1^+) = \sum_{i=1}^{n} F_{ri}(t_1^+) + Mg\sin(\alpha(t_1^-)) - Ra(t_1^-) - M \cdot \left(\frac{dV(t)}{dt}\right)_{t=t_1^-} \quad [9]$$

and whose value tends progressively to 0 during the time $\tau$.

Ultimately this correction is given by the following recurrence formula, where k is a coefficient less than 1, taking into account the delay in detection upon a rapid degradation in the coefficient of adhesion:

$$\Delta F(t_n) = \Delta F(t_{n-1}) - k \cdot \frac{\Delta F(t_1^+)}{\tau} \cdot T \quad \text{with: } k < 1 \quad [10]$$

so long as the value of $\Delta F$ does not go through 0.

The initial value for n=1 of $\Delta F$ being given by [9].

5.6—Final Calculation

Ultimately the estimate of the speed of the vehicle when all of its load-transmitting wheels are slipping with respect to the rolling surface can be expressed according to the invention by the following recurrent relation:

$$V(t_n) = V(t_{n-1}) + \frac{T}{M} \cdot \left[Mg\sin(\alpha(t_1^-)) + \sum_{i=1}^{n} F_{ri}(t_n) + \Delta F(t_n) - Ra(t_{n-1})\right] \quad [11]$$

with:

V(t): speed of the vehicle at the instant t

T: calculation period $T = t_n - t_{n-1}$ $$F_{ri} = \frac{C}{R} - \frac{1}{R^2} \cdot J_i \cdot \frac{dV_{ri}}{dt} \quad [1]$$

$V_{ri}$: speed of wheel, or group of dependent wheels No. i

R: wheel radius

C: driving (>0) or retarding (<0) torque $J_i$: inertias of the rotating masses linked with the wheel or with the group of linked wheels M: mass of the vehicle or of the set of vehicles managed by the same speed estimator and calculated by:

$$M = n \cdot \frac{\sum_{i}^{n} F_{ri}}{\sum_{i}^{n} \left(\frac{dV_{ri}(t)}{dt}\right)_{t=t0}} \quad [3]$$

n: number of groups of independent wheels $t_0$: instant of the first start-up without slip g: acceleration due to gravity: 9.81 m/s²

$$\alpha(t_1^-) = \text{Arcsin}\left(\frac{1}{Mg}\left[M \cdot \left(\frac{dV_{ri}(t)}{dt}\right)_{t=t_1^-} - \sum_{i}^{n} F_{ri}(t_1^-) + Ra(t_1^-)\right]\right) \quad [5]$$

$t_1^-$: instant preceding the instant t1 of slippage of all the wheels $$Ra(t_1^-) = a + b \cdot V_r(t_1^-) + c \cdot V_r(t_1^-)^2 \quad [4\text{ bis}]$$

a, b, c: coefficient defining the vehicle's resistance to forward motion $V_r(t_1^-)$: speed of the last non-slipping wheel stored at the instant $t_1^-$ $$\Delta F(t_n) = \Delta F(t_{n-1}) - k \cdot \frac{\Delta F(t_1^+)}{\tau} \cdot T \quad [10]$$

$$\Delta F(t_1^+) = \sum_{i=1}^{n} F_{ri}(t_1^+) + Mg\sin(\alpha(t_1^-)) - Ra(t_1^-) - M \cdot \left(\frac{dV(t)}{dt}\right)_{t=t_1^-} \quad [9]$$

$$\tau = \frac{L}{V(t_1^-)}$$

L: length of the convoy $$Ra(t_{n-1}) = a + b \cdot V(t_{n-1}) + c \cdot V^2(t_{n-1}) \quad [4]$$

6—Description of the Process

The following overview summarizes the process for estimating the speed of the vehicle on the basis of the measurement of the speeds of the wheels and of the value of the driving or retarding torque applied, when all the wheels are slipping with respect to the rolling surface.

The process consists in calculating initially with the aid of the module A, the loads transmitted to the rolling surface on the basis of the equations for the mechanics of the rotating parts [1] and of the knowledge of the mechanical parameters, for each independent wheel or for a group of mechanically linked wheels.

Knowledge of the elementary loads transmitted then makes it possible, by summing over the set of wheels or groups of independent wheels, to calculate, using the module B, the total load transmitted to the rolling surface.

An estimated value of the speed of the vehicle at any instant can then be calculated by the module C on the basis of the total load applied to the rolling surface by the mechanical model of the vehicle [11] on the basis of the knowledge of its mass.

This mass may vary depending on the loading of the vehicle and it is then more accurate to measure it via the height of the suspensions or the pressure in the secondary suspension cushions. Should this measurement not be available, it is still possible to estimate this mass, using the module D, from the measurement of the acceleration of the vehicle on flat terrain whilst no wheel is slipping with respect to its rolling surface [3].

It is possible, moreover, to take account of the resistance to forward motion as a function of the speed of the vehicle, using the module E, on the basis of the knowledge of the characteristics of the vehicle and of the estimate of its speed resulting from the previous calculation step $V(t_{-1})$ based on relation [4].

To improve the accuracy of the speed estimator when the vehicle is made to negotiate slopes or inclines, account is taken of the value of the slope or of the incline calculated by the module F, at the instant of calculation preceding the initiation of slippage of the last wheel still adhering, according to relation [5].

The propagation of an abrupt variation in adhesion under the wheels of the vehicle and under the wheels of the convoy is taken into account, and the delay in detecting the slipping of the set of wheels in this case is compensated for by equation [10] in the calculation module G.

The sample-and-hold blocks H make it possible to store a value calculated at the previous instant $t_{n-1}$ so as to use it in the calculation of the next calculation step $t_n$.

Lastly, the calculation block F also allows the initialization of the recurrent calculations whose initial values are: $Ra(t_1^-)$ and $\Delta F(t_1^+)$, on the basis of a signal detecting slippage of all the wheels which is delivered at the instant $t_1^+$, the straightforward and known computation of which is not described.

It is now clearly apparent that the train speed estimator uses the measurements:
- of each of the speeds of the mechanically independent load-transmitting wheels,
- of the driving or retarding torque applied,
- of the mass of the vehicle when this measurement is available.

Moreover, the estimator uses the available information characteristic of the vehicle:
- the radius R of the wheels,
- the inertia $J_i$ of the rotating masses linked to each independent wheel,
- the number n of independent wheels per vehicle or per assemblage of vehicles,
- the length L of the vehicle or convoy,
- the coefficients a, b and c for calculating the resistance to forward motion as a function of the speed of the vehicle,
- the mass of the vehicle if it can be regarded as constant.

Lastly, the estimator calculates or estimates physical information which is useful for improving the accuracy of the speed estimate when this information is not directly available, such as:
- the mass of the vehicle, if it is neither measured nor constant,
- the resistance to forward motion,
- the slope or the incline,
- the variation in adhesion encountered by the vehicle on the rolling surface and its propagation under the wheels of the vehicle.

Key to the FIGURE:

A
Mechanical model of the rotating parts.
Calculation of the per-wheel
reactions $F_{ri}$ of the rolling surface [1]
C
Mechanical model of the vehicle.
Calculation of the speed
at the instant tn [11]
D
Initializations at the instant $t_0$ [3]
F
Calculation of the slope or of the incline [5]
Initializations at the
instant $t_1$ [4 bis] [9]
H
Sample and hold at $t = t_{n-1}$
G
Calculation of $\Delta F(t_n)$ [10]
E
Calculation of the resistance to forward motion [4]

We claim:

1. Process for estimating the speed of a vehicle or of an assemblage of vehicles, based on measuring the speeds of the mechanically independent wheels, while all the wheels are slipping with respect to the rolling surface, characterized in that the speed of the vehicle or vehicles V(t) is estimated from the relation:

$$M \cdot \frac{dV(t)}{dt} = Mg\sin(\alpha(t_1^-)) + \sum_{i=1}^{n} F_{ri}(t) - R_a(t)$$

in which:
M denotes the mass of the vehicle,
g denotes the acceleration due to gravity,
$\alpha(t_1^-)$ denotes the slope or incline of the rolling surface just before all the wheels of the vehicle begin to slip,
$F_{ri}(t)$ denotes the reaction force of the rail on wheel No. i of the vehicle,
Ra(t) denotes the resistance to forward motion exerted on the vehicle before all the wheels begin to slip, and
n denotes the number of groups of independent wheels.

2. Process according to claim 1, characterized in that it furthermore comprises a step of discretizing the relation for estimating the speed of the vehicle, the value of the speed being obtained by means of the following recurrent relation:

$$V(tn) = V(tn-1) + \frac{T}{M} \cdot \left[ Mg\sin(\alpha(t_1^-)) + \sum_{i=1}^{n} F_{ri}(t_n) - Ra(t_{n-1}) \right].$$

3. Process according to claim 1, characterized in that to estimate the speed of the vehicle or of the assemblage of vehicles, use is moreover made of:
the length of the vehicle or vehicles and/or
the inertia of the rotating masses mechanically coupled to each wheel or group of mechanically independent wheels and/or
the driving or retarding load applied and/or
the abrupt variation in adhesion encountered by the or each vehicle on the rolling surface and the propagation of the said variation in adhesion under the wheels of the vehicle or vehicles.

4. Process according to claim 1, in which the said estimation of the said speed of the said vehicle or of the said assemblage of vehicles, based on the said measurement of the said speeds of the said mechanically independent wheels, is obtained by adding, to the speed of the said vehicle or vehicles, stored just before all the wheels slip, the variation in the speed of the said vehicle or vehicles, obtained by integrating the acceleration or deceleration of the said vehicle or of the said group of vehicles during the time for which all the wheels are slipping with respect to the rolling surface.

5. Process according to claim 4, in which the said acceleration, or the said deceleration, is calculated from the reaction of the said rolling surface to the said driving or retarding load applied to the wheel, or to the group of mechanically independent wheels, from the said mass of the said vehicle or of the said group of vehicles, from the said resistance to forward motion, from the said slope or from the said incline and from the said variation in adhesion.

6. Process according to claim 5, in which the initial value of the said variation in adhesion is obtained through the difference between the calculated values of the reactions of the rolling surface between the instant immediately subsequent to the instant at which the slipping of all the wheels is detected, and the previous instant at which at least one wheel was still fully adhering.

7. Process according to claim 5, in which the reaction of the said rolling surface to the said driving or retarding load applied by the wheel, or by the group of mechanically independent wheels, is deduced from the measurement of the said driving or retarding load applied and of the speed of the said wheel or of the said group of wheels, on the one hand, and from the knowledge of the said inertia of the said rotating masses linked to the said wheel or to the said group of wheels, on the other hand.

8. Process according to claim 6, in which the said inertia of the said rotating masses is defined as being the inertia seen by the driving or retarding gear when the coefficient of friction with respect to the rolling surface, of the wheel, or of the group of wheels mechanically linked to the said driving or retarding gear, is zero, and hence when the reaction of the rolling surface is zero.

9. Process according to claim 4, in which the acceleration or deceleration of the vehicle or vehicles during the time for which all the wheels are slipping with respect to the rolling surface is obtained by deducting, in terms of algebraic value, the resistance to forward motion of the vehicle or vehicles, from the reaction of the rolling surface to the driving or retarding load applied to the wheel, or to the mechanically independent group of wheels.

10. Process according to claim 4, in which the acceleration or deceleration of the vehicle or vehicles during the time for which all the wheels are slipping with respect to the rolling surface is obtained by adding, in terms of algebraic value, the component of the acceleration or of the deceleration due to gravity, created by the slope or by the incline, to the reaction of the rolling surface to the driving or retarding load applied to the wheel or to the mechanically independent group of wheels.

11. Process according to claim 10, in which the said calculation of the said component of the acceleration or of the said deceleration due to gravity linked with the slope or the incline is carried out continuously, and stored before the instant at which all the wheels start sliding, on the basis of the driving or retarding torque applied to the wheel via the reaction of the rolling surface, of the acceleration or of the deceleration of the vehicle or vehicles, which is obtained by differentiating the average of the speeds of the wheels, of the mass of the vehicle or vehicles and finally of the resistance to forward motion calculated at this instant.

12. Process according to claim 4, in which the acceleration or deceleration of the vehicle or vehicles during the time for which all the wheels are slipping with respect to the rolling surface is obtained by deducting, in terms of algebraic value, from the reaction of the rolling surface to the driving or retarding load applied to the wheel, or to the mechanically independent group of wheels, the abrupt variation in adhesion encountered by the vehicle or vehicles on the rolling surface and the propagation of the said abrupt variation in adhesion under the wheels of the vehicle or vehicles.

13. Process according to claim 4, in which the propagation of the said abrupt variation in adhesion is calculated as being the initial value, decreased linearly as a function of time, of a term proportional to the speed of the vehicle or vehicles at the moment at which the slipping of all the wheels is detected, and inversely proportional to the length of the said vehicle or of the said vehicles.

14. Process according to claim 1, in which the said mass of the said vehicle or of the said group of vehicles is obtained, depending on the type of vehicle, by measuring the pressure in the pneumatic or hydraulic suspensions, or by geometrical measurement of the sinkage of the mechanical suspensions, or by a taring obtained by calculation and storage, on the occasion of the first start-up after formation of the convoy or after a stop at a station, on the basis of the measurement of the acceleration of the vehicle or vehicles on the flat, during the application of a load which causes no slip of any wheel with respect to the rolling surface.

15. Process according to claim 14, in which the said acceleration is obtained by differentiating the average of the speeds of the wheels.

16. Process according to claim 1, in which the said resistance to forward motion, dependent on the speed of the vehicle or vehicles, is calculated continuously at a given instant, on the basis of the coefficients characteristic of the resistance to forward motion of the said vehicle or vehicles and of the speed of the vehicle or vehicles, estimated at the previous calculation instant.

* * * * *